June 29, 1965 J. J. PARKER 3,191,951
DIAPHRAGM CHUCK
Filed July 5, 1963
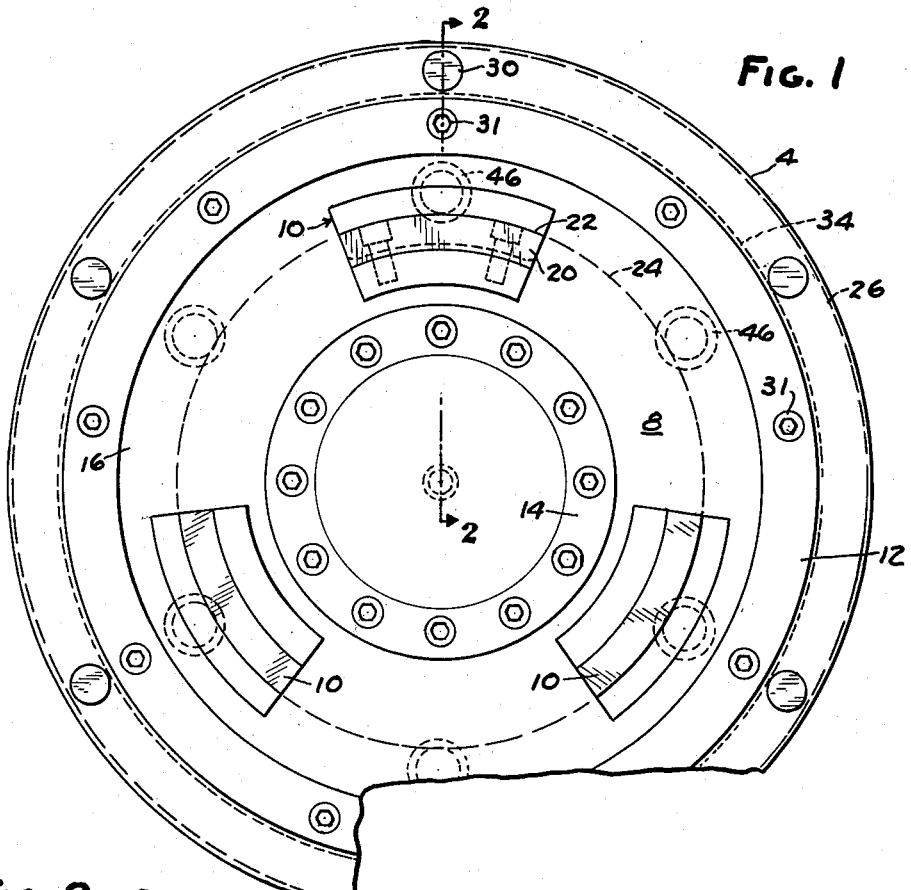
FIG. 1
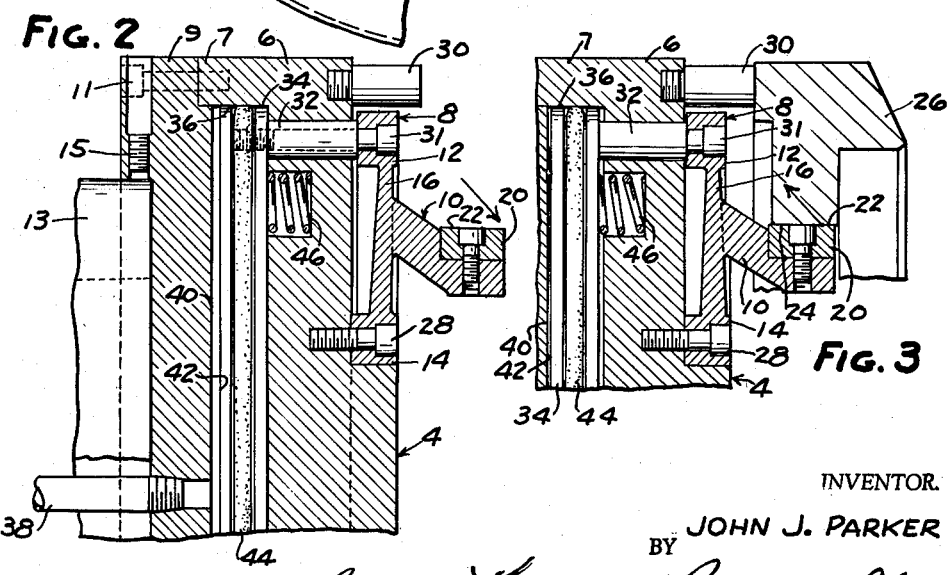
INVENTOR.
JOHN J. PARKER
BY
Barnes, Kisselle, Raisch & Choate
ATTORNEYS

3,191,951
DIAPHRAGM CHUCK
John J. Parker, Detroit, Mich., assignor of one-half to London T. Morawski, Detroit, Mich.
Filed July 5, 1963, Ser. No. 293,059
2 Claims. (Cl. 279—4)

This invention relates to a diaphragm chuck.

The conventional diaphragm chuck comprises a diaphragm secured around its outer periphery of a fixed backing member and having a plurality of jaws arranged concentrically around the center of the diaphragm. The jaws are opened and closed by applying axial force to the central portion of the diaphragm.

The object of this invention is to provide a diaphragm chuck simple in construction and operation and in which the outer periphery of the diaphragm is actuated to open and close the chuck.

In the drawings:

FIG. 1 is a fragmentary end view of a chuck embodying the instant invention.

FIG. 2 is a sectional view taken through the lines 2—2 of FIG. 1 showing the chuck with its gripping jaws in their disengaged position.

FIG. 3 is a similar view to FIG. 2 but shows the chuck having its jaws engaged with the workpiece.

Chuck 4 has a backing plate 6, a diaphragm 8, and work gripping jaws 10. Backing plate 6 has an annular flange 7 connected to a mounting plate 9 by screws 11. Mounting plate 9 is, in turn, secured by suitable means to a rotary head or spindle 13 of a machine tool and is centered thereon by screws 15. Diaphragm 8 has an outer peripheral rim 12 and an inner peripheral rim 14 interconnected by a tapered web 16. Web 16 has a plurality of integral jaws 10, three being shown, extending axially outward from web 16 and radially inward toward the center of the diaphragm 8. Jaws 10 are provided with suitable convex work engaging members 20 whose radially outer faces 22 are contoured corresponding to the inside contour 24 of a workpiece 26. Inner peripheral rim 14 is fastened directly to backing plate 6 by screws 28. Suitable stops 30 for axially positioning workpiece 26 on the chuck are appropriately positioned on backing plate 6 radially outward of diaphragm 8.

Diaphragm 8 is adapted to be flexed at its outer periphery from its work-engaging position (FIG. 3) to its work disengaging position (FIG. 2) by an actuating mechanism which includes screws 31, spacer sleeves 32 and piston 34. Sleeves 32 are axially movable through backing plate 6 and space diaphragm 8 from piston 34. Screws 31 are countersunk in outer peripheral rim 12, pass through sleeve 32 and are threaded in piston 34 to tightly interconnect rim 12 and piston 34 for interrelated movement. Piston 34 shifts axially to the right as viewed in FIG. 2 within the bore 36 of flange 7 when fluid pressure is applied through inlet tube 38 to a chamber bounded by bore 36 and opposed surfaces 40 of mounting plate 9 and back surface 42 of piston 34. A conventional O-ring 44 may be provided in a peripheral groove of piston 34. A suitable compression spring 46 may be recessed in backing plate 6 to assist in returning piston 34 and interconnected diaphragm 8 to the unflexed or work-engaging position (FIG. 3).

With the above-described arrangement, when fluid pressure is applied to the back surface 42 of piston 34, outer peripheral portion 12 of diaphragm 8 will be shifted axially to the right as viewed in FIG. 2, flexing web 16 and moving work-engaging members 20 on an arcuate path axially to the right and radially toward the center of the diaphragm 8 as indicated by the arrow in FIG. 2. With jaws 18 contracted radially inward, workpiece 26 can be placed thereon abutting stops 30. When fluid pressure on piston 34 is relieved, diaphragm 8 returns to its unflexed position under the spring action of web 16 with the assistance of spring 46 acting on piston 34. Work-engaging faces 22 move on an arcuate path radially outward and axially to the left in the direction as indicated by the arrow in FIG. 3. This resultant motion of jaws 18 not only chucks workpiece 26 but, additionally, tends to clamp the workpiece firmly against axial stops 30.

It will be appreciated that although the chuck illustrated is of the I.D. (inner diameter) type, the invention is also applicable to an O.D. (outer diameter) type. In the latter case, the fluid pressure connection 38 would extend to the opposite side of piston 34 and work engaging members would be mounted on the radially inner surfaces of jaws 10. Also, in the case of an O.D. chuck, the clearance between the outer peripheral rim 12 and the axially outer face of backing plate 6 would be sufficient to permit adequate opening of the chuck jaws.

I claim:

1. In a diaphragm chuck the combination comprising a radially extending backing plate, a radially extending mounting plate coaxial with the backing plate and spaced axially therefrom, one of said plates having an axially extending flange around its periphery extending to and engaging the periphery of the other plate to define a piston chamber in the space between the two plates, means spaced around the periphery of and rigidly secured to said two plates together at said flange, piston movable axially in said chamber, a diaphragm coaxial with said plates and having a central portion rigidly secured to said backing plate on the face thereof opposite the piston chamber, a plurality of circumferentially spaced rigid members extending axially through the backing plate adjacent its outer periphery, each of said members having one end anchored to the periphery of the diaphragm and its opposite end anchored to the piston so as to form a rigid connection between the piston and the outer periphery of the diaphragm which causes the outer periphery of the diaphragm to shift as a unit with the piston, a plurality of circumferentially spaced jaws fixedly mounted on the diaphragm and adapted to open and close in response to flexing of the diaphragm in opposite directions as controlled by reciprocation of said piston, means for directing pressure fluid to the piston chamber on one side of the piston for flexing the diaphragm in the jaw-opening direction and a plurality of compression springs acting between one of said plates and the piston for flexing the diaphragm in the jaw-closing direction.

2. The combination called for in claim 1, wherein said jaws are adapted to be moved in the opening direction when the diaphragm flexes in a direction away from the backing plate and wherein said compression springs are arranged between the backing plate and the piston.

References Cited by the Examiner
UNITED STATES PATENTS

| | | | |
|---|---|---|---|
| 2,524,006 | 9/50 | Capellazzi | 279—123 |
| 2,714,514 | 8/55 | Hohwart | 279—1 |
| 2,734,750 | 2/56 | Nyland. | |
| 2,853,306 | 9/58 | Atherholt | 279—4 |

ROBERT C. RIORDON, *Primary Examiner.*